United States Patent
Tabuchi et al.

(10) Patent No.: US 7,962,701 B2
(45) Date of Patent: Jun. 14, 2011

(54) RECORDING MEDUIM PLAYBACK APPARATUS

(75) Inventors: Jyun Tabuchi, Hyogo (JP); Tatsuya Yamaguchi, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 377 days.

(21) Appl. No.: 11/759,863

(22) Filed: Jun. 7, 2007

(65) Prior Publication Data

US 2007/0233998 A1   Oct. 4, 2007

Related U.S. Application Data

(62) Division of application No. 10/914,353, filed on Aug. 9, 2004, now Pat. No. 7,251,719.

(30) Foreign Application Priority Data

Aug. 11, 2003  (JP) .................................. 2003-207181
Aug. 21, 2003  (JP) .................................. 2003-208253

(51) Int. Cl.
    G06F 13/00     (2006.01)
(52) U.S. Cl. .......................... 711/154; 711/156; 711/163
(58) Field of Classification Search .................. 711/154, 711/156, 163
    See application file for complete search history.

(56) References Cited

U.S. PATENT DOCUMENTS

| | | | | |
|---|---|---|---|---|
| 5,689,704 A * | 11/1997 | Yoshida et al. | ................ | 711/111 |
| 6,092,035 A | 7/2000 | Kurachi et al. | | |
| 6,222,807 B1 * | 4/2001 | Min-Jae | ...................... | 369/47.12 |
| 6,262,956 B1 | 7/2001 | Tsuda | | |
| 6,301,638 B1 | 10/2001 | Suzuki et al. | | |
| 6,473,376 B1 | 10/2002 | Tsuda et al. | | |
| 6,480,353 B1 * | 11/2002 | Sacks et al. | ................ | 360/97.02 |
| 6,763,429 B1 * | 7/2004 | Hirayama | ....................... | 711/112 |
| 2004/0068605 A1 * | 4/2004 | Hirasawa | ....................... | 711/100 |
| 2009/0099968 A1 * | 4/2009 | Hunter et al. | ..................... | 705/58 |

FOREIGN PATENT DOCUMENTS

| | | |
|---|---|---|
| JP | 04102014 | 3/1992 |
| JP | 10134491 | 5/1998 |
| JP | 11154156 | 6/1999 |
| JP | 11242875 | 9/1999 |
| JP | 11312384 | 9/1999 |
| JP | 11312382 | 11/1999 |
| JP | 11317054 | 11/1999 |
| JP | 2000023082 | 1/2000 |
| JP | 2000187933 | 7/2000 |

* cited by examiner

*Primary Examiner* — Reba I Elmore
(74) *Attorney, Agent, or Firm* — Fogg & Powers LLC

(57) ABSTRACT

In one aspect of the invention, text data recorded on a CD conforming to the CD-TEXT format is displayed using a minimum amount of memory. Storage capacity to be used per data item is calculated by dividing the available storage capacity by the number of text data items to be displayed on a display section, and the text data is read from the CD and is stored in a memory by limiting the storage capacity per data item to the thus calculated storage capacity. Priority may be given to a specific data item for which full data is acquired, and the remaining capacity may be equally divided among the other data items. In another aspect of the invention, text data recorded in a plurality of different languages on a CD conforming to the CD-TEXT format is acquired in as many languages as possible by using a minimum amount of memory. A block selected based on a predetermined criterion, such as the starting block or a block recorded in a specific language, is acquired first, and then a further block or blocks are selected and acquired as the remaining memory capacity allows.

4 Claims, 2 Drawing Sheets

Fig.2

| | ID1 | ID2 | ID3 | ID4 | TEXT DATA | |
|---|---|---|---|---|---|---|
| PACK(0) | 80 | 00 | 00 | 00 | ALBUM TITLE | |
| PACK(1) | 80 | 01 | 0C | | 00 | TRACK 1 TITLE |
| PACK(2) | 80 | 02 | 0A | | TRACK 2 TITLE | |
| | | | 08 | | | TRACK 2 TITLE |
| | 8F | 00 | 18 | 01 | | |
| | 8F | 01 | 19 | | | |
| | 8F | 02 | 1A | | 09 69 | |
| PACK(0) | 80 | 00 | 90 | | ALBUM TITLE | |
| PACK(1) | 80 | 01 | 96 | | ALBUM TITLE | |
| PACK(2) | 80 | 02 | 9C | | 00 00 | TRACK 1 TITLE |
| | | 03 | 94 | | | TRACK 1 TITLE |
| | 8F | 00 | 27 | 80 | | |
| | 8F | 01 | 28 | | | |
| | 8F | 02 | 29 | | 09 69 | |

BLOCK 0

BLOCK 1

BLOCK 2

US 7,962,701 B2

RECORDING MEDUIM PLAYBACK APPARATUS

RELATED APPLICATIONS

This application is a divisional of U.S. patent application Ser. No. 10/914,353, filed Aug. 9, 2004, which claims the priorities of Japanese Patent Application Nos. 2003-208253, filed Aug. 21, 2003, and 2003/207181, filed Aug. 11, 2003, all of which are incorporated herein by reference.

BACKGROUND OF THE INVENTION

1. Field of the Invention

The present invention relates to a recording medium playback apparatus having the function of reading character codes recorded on a recording medium, and more particularly to a recording medium playback apparatus adapted to read character codes recorded along with audio playback digital data on a recording medium such as a CD, a DVD, or an MD.

2. Description of the Related Art

For example, in a CD (compact disc) that conforms to the CD-TEXT format, character data, for displaying the title of music recorded on each track, artist name, etc. on an operation panel, is recorded in addition to the audio playback digital data recorded on a conventional CD.

The character data is recorded in the lead-in area of the CD, and when the TOC (Table of Contents) information recorded in the lead-in area is read out, the character data is also read out and stored in memory.

The character data is recorded in a plurality of different languages such as English over a plurality of blocks, and data items including the title of each track, artist name, etc. are recorded in each block in each different language. Accordingly, when the number of languages and data items to be read out is large, a large memory area must be secured, which requires the use of an expensive microcomputer having a large internal memory capacity.

Further, when reading out the character data recorded in the lead-in area and storing the readout data in memory, it has traditionally been practiced to read out only the starting block for storage or to read out the data sequentially, starting from the starting block, and to store the data in memory if the memory space is available. There has therefore been the problem that, even when there is a subsequent block that can be acquired, such subsequent data is not acquired.

SUMMARY OF THE INVENTION

Accordingly, a first object of the present invention is to provide a recording medium playback apparatus that can display data items, using a limited memory capacity, even when the number of data items to be displayed is large.

A second object of the present invention is to provide a recording medium playback apparatus that can support as many languages as possible by making maximum use of the available memory capacity.

A recording medium playback apparatus according to the present invention comprises: a memory for storing data comprising a plurality of data items read from a recording medium for output at a later time; storage capacity determining means for determining a storage capacity of the memory to be used per data item, based on a result obtained by dividing an available storage capacity of the memory by the number of data items to be displayed; and means for reading the data from the recording medium and storing the data in the memory by limiting the storage capacity per data item to the determined storage capacity.

The recording medium playback apparatus further comprises storage capacity reserving means for predetermining, for example, for at least one data item, the storage capacity of the memory to be used per data item, wherein the storage capacity determining means determines for the remaining data items the storage capacity of the memory to be used per data item, based on a result obtained by dividing the difference between the available storage capacity and the predetermined storage capacity by the number of remaining data items.

The data item for which to predetermine the storage capacity to be used per data item is specified, for example, by a user.

A recording medium playback apparatus according to the present invention comprises: a memory for storing data comprising a plurality of data items read from a recording medium for output at a later time; and means for reading out the data items in a predetermined sequence from the recording medium and storing the readout data in the memory as the available capacity of the memory allows.

The data items are read out in the predetermined sequence, for example, in increasing order of data size.

A recording medium playback apparatus according to the present invention comprises: a memory for storing data comprising a plurality of data items read from a recording medium for output at a later time; and storage means for reading the data from the recording medium and storing the data in the memory by limiting the amount of data of each data item to the amount of data that can be output per data item.

A recording medium playback apparatus according to the present invention comprises: a memory for storing data comprising a plurality of data items read from a recording medium for output at a later time; and storage means for reading the data from the recording medium, and for storing the data after conversion into a one-byte character code, if the readout data is a two-byte character code and if there is a one-byte character code corresponding thereto.

A recording medium playback apparatus according to the present invention comprises: a memory for storing data comprising a plurality of data items read from a recording medium for output at a later time; and readout storage means for reading data of a designated one of the data items from the recording medium for storage in the memory as it becomes necessary to output the data item.

A plurality of tracks of audio playback digital data, for example, are further recorded on the recording medium, and each of the plurality of data items corresponds to one of the plurality of tracks.

According to the present invention, there is also provided a playback apparatus for a recording medium having recorded thereon a plurality of blocks of character data recorded in a plurality of different languages, comprising: a memory for storing text data read from the recording medium for output to a display at a later time; means for reading out text data of a first block, the first block being one of the plurality of blocks, and for storing the readout text data in the memory; and means for storing text data of a second block in the memory, the second block being a block other than the first block and having a data size equal to or smaller than the remaining capacity of the memory in which the text data of the first block has been stored.

For example, the first block storing means includes means for reading out the character data by selecting, as the first block, the block recorded at the head of the group consisting of the plurality of blocks, and the second block storing means includes means for finding the second block by examining the data sizes of the blocks, starting from the block recorded next to the head and proceeding in the order in which the blocks are recorded.

Alternatively, the first block storing means includes means for reading out the character data by selecting the block recorded in a specific language as the first block.

Alternatively, the first block storing means includes means for reading out the character data by selecting, as the first block, the block having the smallest data size among the plurality of blocks, and the second block storing means includes means for reading out the character data by selecting, as the second block, the block having the smallest data size next to the second block.

Alternatively, the first block storing means and the second block storing means include means for reading out for storage only the block that is recorded in a language capable of being displayed on the display.

Alternatively, the first block storing means and the second block storing means include means for reading out for storage only the block that is recorded in a language specified by a user.

Alternatively, the first block storing means and the second block storing means include means for reading out for storage only the block that is recorded in a language used in a region determined based on position information output from a navigation system.

Alternatively, the first block storing means and the second block storing means include means for reading out for storage only the block that is recorded in a language being used in a received broadcast.

Alternatively, the first block storing means and the second block storing means include means for reading out for storage only the block that is recorded in a language recognized from voice input to a navigation system.

BRIEF DESCRIPTION OF THE DRAWINGS

FIG. 2 is a diagram showing the format of character data recorded on a CD conforming to the CD-TEXT format.

DESCRIPTION OF THE PREFERRED EMBODIMENTS

Figure 1:
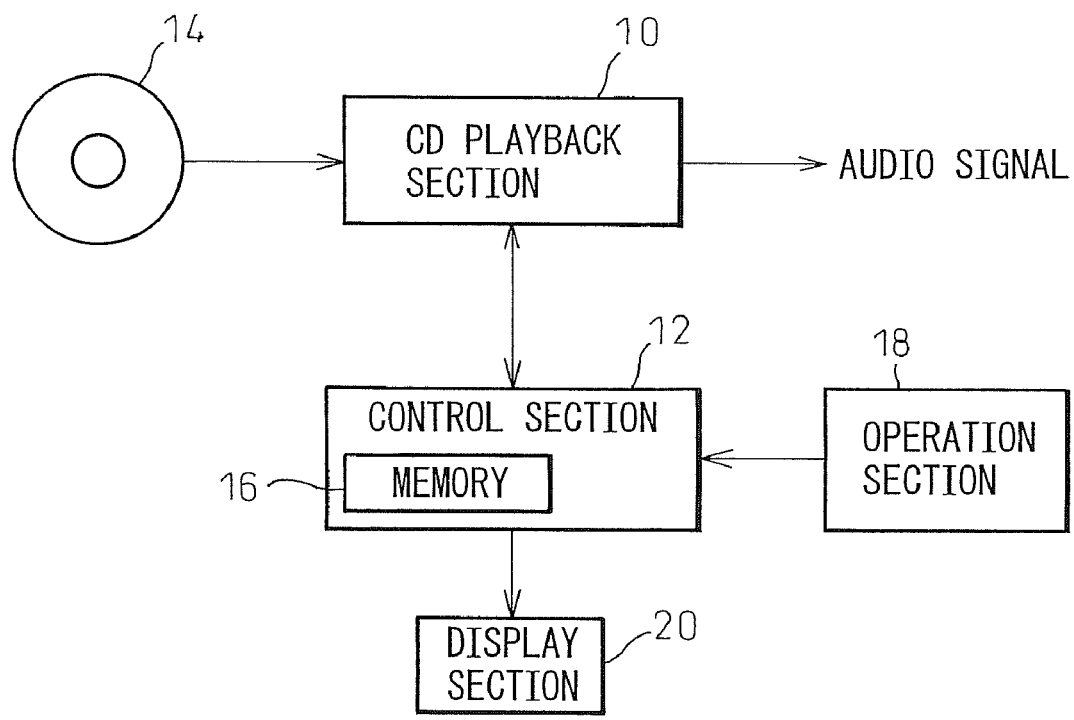
FIG. 1 is a diagram schematically showing the configuration of a CD player according to one embodiment of a recording medium playback apparatus of the present invention.

FIG. 1 is a diagram schematically showing the configuration of a CD-TEXT compatible CD player in one embodiment of the recording medium playback apparatus of the present invention.

In FIG. 1, a CD playback section 10, under direction of a control section 12, reads out character data such as the titles of music recorded on a CD 14 and artist names, etc. from the lead-in area of the CD 14. The character data thus read out is temporarily stored in a memory 16 internal to the control section 12. Under direction of the control section 12, the CD playback section 10 further reads out a digitized audio signal from each track in the program area of the CD 14, and plays back the audio signal for output. In synchronism with this, or in accordance with an operation performed on an operation section 18, the control section 12 outputs characters showing the title of music, artist name, etc. for display on a display section 20 based on the character data stored in the memory 16.

FIG. 2 shows the format of the character data recorded on R to W channels in the lead-in area of a CD conforming to the CD-TEXT format. To simplify error processing, the character data shown in FIG. 2 is repeated a plurality of times for recording in the lead-in area.

In FIG. 2, the character data comprises a plurality of blocks consisting of block 0, block 1, and so on, and each block comprises a plurality of packs consisting of pack(0), pack(1), and so on. Each pack is 18-byte long. In each pack, the first four bytes ID1 to ID4 are followed by text data written with character codes of 12 bytes. The text data is followed by a two-byte CRC field which is not shown in FIG. 2.

In each block, the first byte of the text data field of the pack whose ID1 is 8F (hexadecimal, the same applies hereinafter) and whose ID2 is 00 designates the character code used in the block to which the pack belongs. For example, when this byte is 00 or 01, the character code used in that block is a one-byte character code, while when the byte is any one of 80 to 82, a two-byte character code is used in that block. In the example shown in FIG. 2, since, in block 0, 01 is recorded in the first byte of the text data field of the pack whose ID1 is 8F and whose ID2 is 00, a one-byte character code (ISO 646 ASCII) is used in block 0. In block 1, on the other hand, the first byte of the text data field of the pack whose ID1 is 8F and whose ID2 is 00 carries 80, which means that a two-byte character code (MS-JIS) is used in block 1.

In each block, the language code used is recorded in the fifth and subsequent bytes of the text data field of the pack whose ID1 is 8F and whose ID2 is 02. In the example shown in FIG. 2, the language code used in block 0 is 09 which indicates English, while in block 1 the language code is 69 which indicates Japanese.

In the text data fields of the packs whose ID1 is 80, album name and the titles of music recorded in the respective tracks are recorded contiguously, with a null code 00 (in the case of a one-byte character) or 00 00 (in the case of a two-byte character) recorded to separate each track (each item of text data). In the example shown in FIG. 2, in block 0, album name is recorded using the text data field of pack (0) and the first byte of pack (1); then, following a null code 00, the title of track 1 is recorded using the area up to the third byte of pack (2) and, following another null code 00, the title of track 2 is recorded. In block 1, album name is recorded in a two-byte character code using the text data fields of pack (0) and pack (1) and the first two bytes of pack (2); then, following a two-byte null code 00 00, the title of track 1 is recorded in a two-byte character code.

Embodiments of the present invention will be described based on the following example:
  total storage capacity available for use: 40 bytes;
  number of text data items to be loaded into memory: 5;
  number of bytes in first item: 10 bytes;
  number of bytes in second item: 7 bytes;
  number of bytes in third item: 18 bytes;
  number of bytes in fourth item: 4 bytes; and
  number of bytes in fifth item: 21 bytes.

In a first embodiment of the present invention, the storage capacity that can be secured for storing character data is divided by the number of text data items to be loaded at a time into the memory 16, and the result is taken as the amount of data to be loaded per data item; then, the character data is stored in the memory 16 by liming the amount of data per data item to the thus determined amount. In the above example, 40/5=8, which means that the second and fourth items are fully stored in the memory, but that the first, third, and fifth items are each stored up to eight bytes in the memory.

Alternatively, priority may be given to a specific data item for which full data is acquired, and the remaining capacity may be equally divided among the other data items. That is, in the above example, all the 18 bytes are acquired for the third item, for example, and five bytes obtained by dividing the remaining capacity of 22 bytes by 4 is assigned to each of the other data items. Here, which data item is to be given priority may be specified by the user, and more than one data item may be specified. In the above example, if the fourth and fifth items are specified, for example, then (40−4−21)/3=5 bytes are assigned to each of the other items.

In a second embodiment of the present invention, the data is loaded in a predetermined sequence into the memory, and data that has not been loaded is not displayed. In the above example, starting from the first item, the data is loaded in sequence into the memory and, for the fifth item, only one byte is loaded. In this case, the fifth item for which only part of the data has been able to be loaded, for example, is not displayed.

Alternatively, the data may be acquired in increasing order of data size. That is, in the above example, the fourth item, the second item, the first item, the third item, and the fifth item are loaded in this order into the memory; for the fifth item, only one byte is loaded.

In a third embodiment of the present invention, as much data as can be displayed on the display section (FIG. 1) is acquired for each data item and stored in the memory 16. In the above example, if the number of characters that can be displayed is 8, eight bytes are acquired for each data item. For the second and fourth items, only seven bytes and four bytes are respectively acquired.

In a fourth embodiment of the present invention, when alphanumeric characters are recorded in a two-byte character code, such characters are converted into the corresponding one-byte character code for storage in the memory so that as much data as possible can be stored in the memory.

In a fifth embodiment of the present invention, data is read from the CD, as necessary, to display the data on the display section 20. In this case, the necessary storage capacity is no more than the data size of the data item that has the largest data size.

As shown in FIG. 2, as the packs in each block carry consecutive numbers in their ID3 fields, the data size of each block can be found by referring to the ID3 of the last pack in the block. In the example shown in FIG. 2, the ID3 of the last pack in block 0 is 1 A (decimal number 26), so that the data size of block 0 is (26+1).times.16=432 bytes. Likewise, since the ID3 of the last pack in block 1 is 29 (decimal number 41), the data size of block 1 is (41+1).times.16=672 bytes.

A sixth embodiment of the present invention will be described by taking as an example the case where the memory capacity for data acquisition is 1 Kbytes and data such as shown in Table 1 below is recorded on the CD.

TABLE 1

|  | Block 0 | Block 1 | Block 2 | Block 3 | Block 4 |
|---|---|---|---|---|---|
| Language | English | German | Japanese | French | Chinese |
| Data size | 0.5K | 0.7K | 0.4K | 0.3K | 0.2K |

Suppose here that the data in block 1 recorded in German is acquired first, in accordance with a certain criterion (described later); in this case, 0.7K byes are necessary to acquire the block recorded in German, and the remaining capacity is 0.3 bytes. The block recorded in Japanese next to the German block requires 0.4 Kbytes and, therefore, will not be acquired; the next block recorded in French is 0.3 Kbytes and is, therefore, will be acquired.

As the criterion for determining the block to be acquired first, for example the starting block, i.e., block 0, may be selected as the block to be acquired first. In this case, the 0.5-Kbyte data recorded in block 0, i.e., the English block, is acquired first, but the next block 1, which is the German block with 0.7 Kbytes, will not be acquired here; the next block 2 recorded in Japanese is 0.4 Kbytes and is, therefore, acquired here. The remaining capacity is 0.1 Kbytes, so that no more blocks are acquired here.

Alternatively, a block recorded in a specific language, for example, Japanese, may be determined in advance as the block to be acquired first; in this case also, other blocks can be acquired in a procedure similar to that described above.

Further, provisions may be made to acquire the blocks in increasing order of data size. In this case, a total of three blocks can be acquired, first the Chinese block, and then the French block and the Japanese block in this order.

Alternatively, provisions may be made to preferentially acquire the blocks written in the languages that can be displayed on the display section 20 (FIG. 1). For example, when the languages supported by the control section 12 and display section 20 are English and French, the English block and the French block are preferentially acquired.

Provisions may also be made to allow the user to specify the language to be acquired, and the block recorded in the language specified by the user may be acquired preferentially.

In the case of an automotive CD deck, there are cases where such a deck is mounted together with a navigation system. In such cases, the region may be determined based on the position information of the host vehicle that the navigation system outputs, and the block recorded in the language used in that region may be acquired preferentially. When a broadcast receiving apparatus is mounted, the block recorded in the language being used in the received broadcast may be acquired preferentially. Further, it also becomes possible to preferentially acquire the block recorded in the language recognized from the voice input to the navigation system.

The processing described above can be implemented in software in which the operations of a CPU (not shown) internal to the control section 12 of FIG. 1 are programmed.

What is claimed is:

1. A recording medium playback apparatus comprising:
    a memory for storing data comprising a plurality of data items read from a recording medium for output at a later time, the memory configured to store information associated with music, wherein the data items include at least one of a title of the music and artist information for the music;
    storage capacity determining means for determining a storage capacity of the memory to be used per data item, based on a result obtained by dividing an available storage capacity of the memory by the number of data items to be displayed; and
    means for reading the data from the recording medium and storing the data in the memory by limiting the storage capacity per data item to the determined storage capacity.

2. A recording medium playback apparatus according to claim 1, further comprising:
    storage capacity reserving means for predetermining, for at least one data item, the storage capacity of the memory to be used per data item;

wherein the storage capacity determining means determines for the remaining data items the storage capacity of the memory to be used per data item, based on a result obtained by dividing the difference between the available storage capacity and the predetermined storage capacity by the number of remaining data items.

3. A recording medium playback apparatus according to claim 2, wherein the data item for which to predetermine the storage capacity to be used per data item is specified by a user.

4. A recording medium playback apparatus according to claim 1, wherein a plurality of tracks of audio playback digital data are further recorded on the recording medium, and each of the plurality of data items corresponds to one of the plurality of tracks.

* * * * *